(12) United States Patent
Nishiwaki

(10) Patent No.: US 9,976,904 B2
(45) Date of Patent: May 22, 2018

(54) PHOTODETECTION APPARATUS INCLUDING OPTICAL FILTER AND OPTICAL DETECTOR

(71) Applicant: Panasonic Intellectual Property Management Co., Ltd., Osaka (JP)

(72) Inventor: Seiji Nishiwaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 15/206,266

(22) Filed: Jul. 9, 2016

(65) Prior Publication Data

US 2017/0023410 A1    Jan. 26, 2017

(30) Foreign Application Priority Data

Jul. 23, 2015   (JP) .................... 2015-145785

(51) Int. Cl.
    *G01J 3/453*   (2006.01)
    *G01J 3/02*    (2006.01)
    *G01J 3/10*    (2006.01)

(52) U.S. Cl.
    CPC .......... *G01J 3/4531* (2013.01); *G01J 3/0205* (2013.01); *G01J 3/0208* (2013.01); *G01J 3/0229* (2013.01);
    (Continued)

(58) Field of Classification Search
    CPC . G01J 3/4531; G01J 3/4538; G01J 2003/4538
    See application file for complete search history.

(56) References Cited

U.S. PATENT DOCUMENTS 5,582,169 A * 12/1996 Oda ................... A61B 5/14553
                                                        600/310
5,627,638 A *  5/1997 Vokhmin ........... G01M 11/0278
                                                        250/223 B
(Continued)

FOREIGN PATENT DOCUMENTS

JP        2001-133395        5/2001
JP        2001-153795        6/2001
(Continued)

OTHER PUBLICATIONS

Goro Nishimura "Prospects for Near Infrared Spectroscopy—Possibilities of 1μm Wavelength Region" The 14th Annual Meeting of Japanese Society for Medical Near Infrared Spectroscopy, vol. 49, 2009, pp. 139-145.

*Primary Examiner* — Dominic J Bologna
(74) *Attorney, Agent, or Firm* — McDermott Will & Emery LLP

(57) ABSTRACT

In one aspect, an apparatus includes a first light source that applies first light having a first wavelength as a center wavelength to an object, a second light source that applies second light having a second wavelength as a center wavelength longer than the first wavelength to the object, an optical filter that includes first and second regions and that transmits third light produced by the first and second light each passed through or reflected by the object, first and second optical detectors that determine first and second amounts, respectively, of the third light passed through the first and second regions. The transmission ranges of spectral transmission curves of the first and second regions are located between the first wavelength and the second wavelength. The spectral transmission curve of the first region has a width at half maximum different from that of the spectral transmission curve of the second region.

29 Claims, 9 Drawing Sheets

(52) U.S. Cl.
CPC ............ *G01J 3/10* (2013.01); *G01J 2003/102* (2013.01); *G01J 2003/104* (2013.01); *G01J 2003/4538* (2013.01)

(56) References Cited

U.S. PATENT DOCUMENTS

| | | | |
|---|---|---|---|
| 9,752,931 B2* | 9/2017 | Waldmann | G01J 3/0205 |
| 2005/0073685 A1* | 4/2005 | Arai | G01N 21/27 356/419 |
| 2009/0116029 A1* | 5/2009 | Ohtera | G01J 3/02 356/456 |
| 2011/0047867 A1* | 3/2011 | Holland | G01J 3/10 47/1.5 |
| 2016/0252396 A1* | 9/2016 | Tack | G01J 3/26 348/262 |

FOREIGN PATENT DOCUMENTS

| | | |
|---|---|---|
| JP | 2009-257919 | 11/2009 |
| JP | 2014-126491 | 7/2014 |

* cited by examiner

PHOTODETECTION APPARATUS INCLUDING OPTICAL FILTER AND OPTICAL DETECTOR

BACKGROUND

1. Technical Field

The present disclosure relates to a photodetection apparatus, a photodetection system, and a method of detecting light.

2. Description of the Related Art

Light, which is an electromagnetic wave, is characterized by wavelength, intensity, and polarization. Light having a wavelength in a near-infrared region is known to have relatively high transmittance to a living organism, and the light travels to a depth of a few centimeters in the living organism. The light reflecting on or passing through a scatter such as the living organism loses the polarization information, and thus the information about the inside of the scatter is obtained mainly by determining the intensity of light for each color (wavelength). In this method, pieces of the information about the living organism overlap in the traveling direction of the light, i.e., in the depth direction of the living organism, and thus the pieces of the information are difficult to be separated in the depth direction. "The 14th Japanese Society for Medical Near Infrared Spectroscopy, pp. 139-144, Near-infrared Spectroscopy in a 1-μm Wavelength region: Current and Future, NISHIMURA Goro" (Hereinafter, referred to as Non-Patent Literature 1) discloses that pieces of the information about the inside of the scatter are separated in the depth direction in accordance with a time-resolved measurement.

SUMMARY

In one aspect, the techniques disclosed here feature a photodetection apparatus that includes: a first light source that, in operation, applies a first light beam having a first wavelength as a center wavelength to an object; a second light source that, in operation, applies a second light beam having a second wavelength as a center wavelength longer than the first wavelength to the object; an optical filter that includes a first region and a second region and that, in operation, transmits a third light beam produced by the first light beam and the second light beam each passed through or reflected by the object; a first optical detector that, in operation, determines a first amount of a first part of the third light beam passed through the first region; and a second optical detector that, in operation, determines a second amount of a second part of the third light beam passed through the second region, wherein: a spectral transmission curve of the first region has a first center wavelength, a first transmission range and a first width at half maximum; a spectral transmission curve of the second region has a second center wavelength, a second transmission range and a second width at half maximum; the first and second transmission ranges are located between the first wavelength and the second wavelength; and the first width at half maximum is different from the second width at half maximum. In another aspect, the techniques disclosed here feature a photodetection apparatus that includes: a first light source that, in operation, applies a first light beam having a first wavelength as a center wavelength to an object; a second light source that, in operation, applies a second light beam having a second wavelength as a center wavelength longer than the first wavelength to the object; an optical filter that, in operation, receives and optically filters a third light beam produced by the first light beam and the second light beam each passed through or reflected by the object, the optical filter having a spectral transmission curve, of which range of transmission is longer than the first wavelength and shorter than the second wavelength; an optical detector that, in operation, determines an amount of the third light beam passed through the optical filter; and controlling circuitry that, in operation, controls intensity of the first light beam and intensity of the second light beam. In another aspect, the techniques disclosed here feature an apparatus that includes: an optical filter including a first region and a second region; a first optical detector, provided for the first region, for determining a first amount of a first light beam passed through the first region; and a second optical detector, provided for the second region, for determining a second amount of a second light beam passed through the second region, wherein: a spectral transmission curve of the first region has a first center wavelength, a first transmission range and a first width at half maximum; a spectral transmission curve of the second region has a second center wavelength, a second transmission range and a second width at half maximum; the first and second transmission ranges are located between a first wavelength and a second wavelength; and the first width at half maximum is different from the second width at half maximum.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 7A:
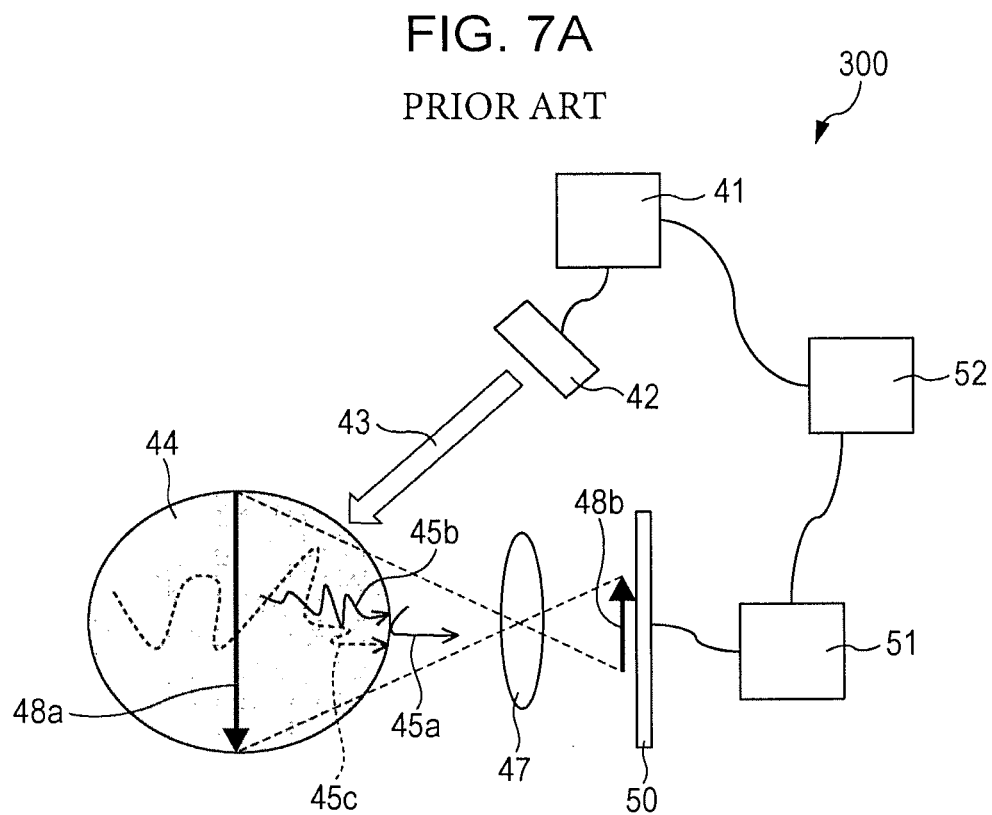
FIG. 7A is a schematic view illustrating a conventional example.

Before an embodiment of the present disclosure is described, the result of the study conducted on near infrared biospectroscopy disclosed in Non-Patent Literature 1 is discussed. The spectroscopy disclosed in Non-Patent Literature 1 determines a light intensity distribution for each distance traveled by the light. FIG. 7A is a schematic cross-sectional view illustrating a photodetection system 300 known in the art. A light source 42 emits a laser beam. As illustrated in FIG. 7A, light 43 having a wavelength of $\lambda_0$ is emitted from the light source 42 and is applied to an object 44. Then, scattered light beams 45a, 45b, and 45c produced on or inside the object 44 are collected by a condenser lens 47, and an image 48b is formed at an imaging plane of the condenser lens 47. A substantive body (object points) 48a, which corresponds to the image 48b, is positioned on a side of the condenser lens 47 adjacent to the body. A photodetector 50 is disposed on the imaging plane.

The photodetector 50 includes a plurality of pixels and detects the light incident on each of the pixels. A controller 41 controls emission of the light source 42. The amount of light determined by the photodetector 50 is processed by processing circuitry 51 as a detection signal. The controller 41 and the processing circuitry 51 are collectively controlled by a computer 52.

Figure 7B:
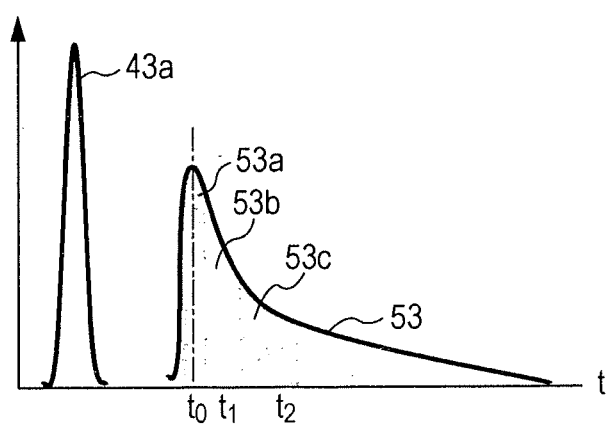
FIG. 7B is a schematic view illustrating a conventional example.

FIG. 7B illustrates a relationship between oscillation induced in the light source 42 and the detection signal of the photodetector 50 in the photodetection system 300 illustrated in FIG. 7A. The light source 42 produces a pulse 43a under control of the controller 41. The light 43 including the pulse 43a scatters inside the object 44, and then the photodetector 50 receives the light 43 as a signal 53. In FIG. 7B, a vertical axis indicates oscillation intensity of the light source 42 or detection intensity of the photodetector 50, and a horizontal axis indicates an elapsed time. The time width of the detection signal 53 is wider than that of the pulse 43a due to the scattering, which varies the light path length. A first output signal 53a of the detection signal 53 is a signal of a light beam 45a reflected by the surface of the object 44. An output signal 53b in a period between t0 to t1 after the output signal 53a is a signal of a light beam 45b scattered and traveled in the object 44 for a short distance. An output signal 53c in a period between t1 to t2 after the output signal 53b is a signal of a light beam 45c scattering and traveling in the object 44 for a long distance. The control by the computer 52 enables the processing circuitry 51 to resolve the detection signal 53 in terms of time such that the output signals 53a, 53b, and 53c are separately detected. Since the light beams have passed through regions of the object in the order of output signals 53a, 53b, and 53c from a shallow region to a deep region, the information is able to be separated into pieces of information in the depth direction and analyzed.

The inventor of the present disclosure conducted a study and found that the photodetector known in the art has a limitation of time resolution width, and thus the photodetector does not have sufficient resolution in the depth direction of the object. In the case that the time resolution width is 300 ps, for example, the resolution in the depth direction is about 90 mm. This is unsuitable for diagnose or test for a relatively small object such as a living organism.

The inventor of the present disclosure have conductive a study to solve the above-described problem, and achieved a novel photodetector, a novel photodetection system, and a novel method of detecting light.

A method of detecting light in a first mode of the present disclosure includes applying a light beam having a center wavelength of $\lambda_0-\alpha$ and a light beam having a center wavelength of $\lambda_0+\alpha$ to an object, allowing the light beams passed through or reflected by the object to transmit through an optical filter having a center transmission wavelength of $\lambda_0$ and including a first region and a second region, a transmission wavelength of the first region having a width at half maximum different from that of the second region, and determining first and second amounts of the light beams passed through the first and second regions, respectively. With this configuration, the first and second amounts of the light beams enable detection of an interference light beam of the two light beams, which are forward scattered and backscattered in the scatter of the object and have the center wavelength of $\lambda_0-\alpha$ and the center wavelength of $\lambda_0+\alpha$. This enables the evaluation of the forward scattering and the backscattering. Thus, information about a scattering intensity pattern of the object is obtained.

The method of detecting light in a second mode of the present disclosure further includes calculating a ratio between the first amount and the second amount of the light beams. With this configuration, more accurate information about the scattering intensity pattern of the object is obtained.

The method of detecting light in a third mode of the present disclosure includes determining the first amount and the second amount of the light beams by using a photodetection apparatus including a plurality of the first regions and a plurality of the second regions. The plurality of first regions and the plurality of second regions are alternately arranged such that each of the plurality of first regions and the plurality of second regions are adjacent to each other. With this configuration, since the first regions and the second regions are adjacent to each other, the center wavelength of the interference light beam is more accurately estimated.

The method of detecting light in a fourth mode of the present disclosure includes allowing the light beam having the center wavelength of $\lambda_0-\alpha$ and the light beam having the center wavelength of $\lambda_0+\alpha$ to enter a target layer of the object to be observed at an equal angle from both sides of the target layer. With this configuration, the position in the depth direction of the object is accurately controlled such that the position of the target layer to be observed is identified.

A photodetection apparatus in a fifth mode of the present disclosure includes a photodetection layer including a plurality of photodetectors arranged in two dimensions, and an optical filter disposed on the photodetection layer. The optical filter has a center transmission wavelength of $\lambda_0$ and includes a plurality of first regions and a plurality of second regions. The first regions each have a width at half maximum of a transmission wavelength different from that of the second regions. Each of the photodetectors faces a corresponding one of the first regions and the second regions. With this configuration, the light entered the photodetection apparatus is separated, when passed through the optical filter, into a transmission light beam passed through the region having a wide width at half maximum of the transmission wavelength and a transmission light beam passed through the region having a narrow width at half maximum of the transmission wavelength. This enables the amounts of the light beams to be separately determined. Thus, the information about the layers in the object is obtained.

In the photodetection apparatus in a sixth mode of the present disclosure, the plurality of first regions and the plurality of second regions form a stripe pattern or a checker board pattern.

A photodetection system in a seventh mode of the present disclosure includes the photodetection apparatus according to the fifth or sixth mode and a light source that emits a light beam having a center wavelength of $\pi_0-\alpha$ and a light beam having a center wavelength of $\lambda_0+\alpha$ to an object. With this configuration, the first and second amounts of the light beams enable detection of an interference light beam of the two light beams, which are forward scattered and backscattered in the scatter of the object and have the center wavelength of $\lambda_0-\alpha$ and the center wavelength of $\lambda_0+\alpha$. This enables the evaluation of the forward scattering and the backscattering. Thus, information about a scattering intensity pattern of the object is obtained.

The photodetection system in an eighth mode of the present disclosure further includes processing circuitry. The photodetection apparatus receives the light beams passed through or reflected by the object and determines the first and second amounts of the light beams passed through the first and second regions. The processing circuitry calculates a ratio between the first amount and the second amount of the light beams to produce a distribution image by using the calculated value. With this configuration, an image based on the information about the scattering intensity pattern of the object is obtained.

In the photodetection system in a ninth mode of the present disclosure, the light source emits a pulsed light beam. With this configuration, the information about the layers in the object is measured with a high degree accuracy compared with the case that the light source emits a continuous light beam.

In the photodetection system in a tenth mode of the present disclosure, the processing circuitry calculates a ratio between the first amount of the light beam and the second amount of the light beam for each of the detectors, and the processing circuitry produces a first image by using at least one of the first amount and the second amount of the detectors in which the ratio is equal to or larger than the predetermined threshold value and produces a second image by using at least one of the first amount and the second amount of the detectors in which the ratio is smaller than the predetermined threshold value. With this configuration, the image based on forward scattering and the image based on backscattering are obtained.

The embodiments described below provide general or specific examples. Numbers, shapes, materials, components, positions of the components described in the following embodiments are examples. The present disclosure is not limited to the embodiments. The components of the following embodiments that are not included in an independent claim, which constitutes the broadest concept of the present disclosure, are optional.

The present disclosure provides at least a photodetection apparatus described below.

First Aspect

A photodetection apparatus according to the first aspect includes a first light source, a second light source, an optical filter, a first optical detector, and a second optical detector. In operation, the first light source applies a first light beam having a first wavelength as a center wavelength to an object and the second light source applies a second light beam having a second wavelength as a center wavelength longer than the first wavelength to the object. The optical filter includes a first region and a second region and, in operation, transmits a third light beam produced by the first light beam and the second light beam each passed through or reflected by the object. In operation, the first optical detector determines a first amount of a first part of the third light beam passed through the first region and the second optical detector determines a second amount of a second part of the third light beam passed through the second region. A spectral transmission curve of the first region has a first center wavelength, a first transmission range and a first width at half maximum. A spectral transmission curve of the second region has a second center wavelength, a second transmission range and a second width at half maximum. The first and second transmission ranges are located between the first wavelength and the second wavelength. The first width at half maximum is different from the second width at half maximum.

Second Aspect

In the photodetection apparatus according to the first aspect, the first center wavelength may be equal to the second center wavelength.

Third Aspect

In the photodetection apparatus according to the first or second aspect, each of the first light beam and the second light beam may be a pulsed light beam.

Fourth Aspect

In the photodetection apparatus according to any one of the first to third aspects, in operation, the first light source may apply the first light beam to a target surface of the object at a certain incident angle from one side of the target surface of the object, and the second light source may apply the second light beam to the target surface of the object at the certain incident angle from another side of the target surface.

Fifth Aspect

In the photodetection apparatus according to any one of the first to fourth aspects, the third light beam may be an interference light beam produced by interference between the first light beam and the second light beam.

Sixth Aspect

In the photodetection apparatus according to any one of the first to fifth aspects, a plurality of first regions may be provided in the optical filter, each of the plurality of first regions being the first region, a plurality of second regions may be provided in the optical filter, each of the plurality of second regions being the second region, a plurality of first optical detectors may be provided in the photodetection apparatus, each of the plurality of first optical detectors being the first optical detector, a plurality of second optical detectors may be provided in the photodetection apparatus, each of the plurality of second optical detectors being the second optical detector, each of the plurality of first regions and each of the plurality of second regions may be alternately arranged in plan view, each of the plurality of first optical detectors and each of the plurality of second optical detectors may be alternately arranged in plan view, each of the plurality of first regions may face at least one of the plurality of first optical detectors in plan view, and each of the plurality of second regions may face at least one of the plurality of second optical detectors in plan view.

Seventh Aspect

In the photodetection apparatus according to the sixth aspect, the plurality of first regions may be arranged in a stripe pattern or a checker board pattern in plan view.

Eighth Aspect

The photodetection apparatus according to any one of the first to fifth aspects may further include processing circuitry that, in operation, calculates a ratio between the first amount and the second amount.

In the photodetection apparatus according to the eighth aspect, the processing circuitry may include a memory storing a program, and the program, when executed by the processing circuitry, may cause the processing circuitry to calculate the ratio between the first amount and the second amount.

Ninth Aspect

The photodetection apparatus according to any one of the first to fifth aspects may further include processing circuitry that, in operation, calculates at least one selected from the group consisting of a first proportion of the first amount to a total of the first amount and the second amount and a second proportion of the second amount to the total.

In the photodetection apparatus according to the ninth aspect, the processing circuitry may include a memory storing a program, and the program, when executed by the processing circuitry, may cause the processing circuitry to calculate at least one selected from the group consisting of the proportion of the first amount to the total of the first amount and the second amount and the proportion of the second amount to the total.

Tenth Aspect

The photodetection apparatus according to the sixth or seventh aspect may further include processing circuitry that, in operation, calculates, for each of the plurality of first optical detectors, a ratio between the first amount and the second amount determined by one of the plurality of second optical detectors adjacent to a corresponding one of the plurality of first optical detectors to produce an image indicating a distribution of ratios in plan view.

In the photodetection apparatus according to the tenth aspect, the processing circuitry may include a memory storing a program, and the program, when executed by processing circuitry, may cause the processing circuitry to calculate, for each of the plurality of first optical detectors, the ratio between the first amount and the second amount determined by one of the plurality of second optical detectors adjacent to the corresponding one of the plurality of first optical detectors to produce the image indicating the distribution of the ratios in plan view.

Eleventh Aspect

The photodetection apparatus according to the sixth or seventh aspect may further include processing circuitry that, in operation, calculates, for each of the plurality of first optical detectors, at least one selected from the group consisting of a first proportion of the first amount to a total of the first amount and the second amount determined by one of the plurality of second optical detectors adjacent to a corresponding one of the plurality of first optical detectors and a second proportion of the second amount to the total to produce an image indicating a distribution of at least one selected from the group consisting of the first proportion and the second proportion.

In the photodetection apparatus according to the eleventh aspect, the processing circuitry may include a memory storing a program, and the program, when executed by the processing circuitry, may cause the processing circuitry to calculate, for each of the plurality of first optical detectors, at least one selected from the group consisting of the first proportion of the first amount to the total of the first amount and the second amount determined by one of the plurality of second optical detectors adjacent to the corresponding one of the plurality of first optical detectors and the second proportion of the second amount to the total to produce the image indicating the distribution of at least one selected from the group consisting of the first proportion and the second proportion.

Twelfth Aspect

A photodetection apparatus according to the twelfth aspect includes: a first light source that, in operation, applies a first light beam having a first wavelength as a center wavelength to an object; a second light source that, in operation, applies a second light beam having a second wavelength as a center wavelength longer than the first wavelength to the object; an optical filter that, in operation, receives and optically filters a third light beam produced by the first light beam and the second light beam each passed through or reflected by the object, the optical filter having a spectral transmission curve, of which range of transmission is longer than the first wavelength and shorter than the second wavelength; an optical detector that, in operation, determines an amount of the third light beam passed through the optical filter; and controlling circuitry that, in operation, controls intensity of the first light beam and intensity of the second light beam.

In the photodetection apparatus according to the twelfth aspect, the controlling circuitry may include processing circuitry and a memory storing a program, and the program, when executed by the processing circuitry, may cause the controlling circuitry to control the intensity of the first light beam and the intensity of the second light beam.

Thirteenth Aspect

In the photodetection apparatus according to the twelfth aspect, each of the first light beam and the second light beam may be a pulsed light beam.

Fourteenth Aspect

In the photodetection apparatus according to the twelfth or thirteenth aspect, in operation, the first light source may apply the first light beam to a target surface of the object at a predetermined incident angle from one side of the target surface, and the second light source may apply the second light beam to the target surface at the incident angle from another side of the target surface.

Fifteenth Aspect

In the photodetection apparatus according to any one of the twelfth to fourteenth aspects, the third light beam may be an interference light beam produced by interference between the first light beam and the second light beam.

Sixteenth Aspect

The photodetection apparatus according to any one of the twelfth to fifteenth aspects may further include processing circuitry that calculates a ratio between the intensity of the first light beam and the intensity of the second light beam to produce an image indicating a relationship between ratios and the amount of the third light beam.

In the photodetection apparatus according to the sixteenth aspect, the processing circuitry may include a memory storing program, the program, when executed by the processing circuitry, may cause the processing circuitry to calculate the ratio between the intensity of the first light beam and the intensity of the second light beam to produce the image indicating the relationship between the ratios and the amount of the third light beam.

Seventeenth Aspect

The photodetection apparatus according to any one of the twelfth to fifteenth aspects may further include processing circuitry that, in operation, calculates at least one selected from the group consisting of a first proportion of the intensity of the first light beam to a total of the intensity of the first light beam and the intensity of the second light beam and a second proportion of the intensity of the second light beam to the total to produce an image indicating a relationship between the amount of the third light beam and at least one selected from the group consisting of the first proportion and the second proportion.

In the photodetection apparatus according to the seventeenth aspect, the processing circuitry may include a memory storing program, the program, when executed by the processing circuitry, may cause the processing circuitry to calculate at least one selected from the group consisting of the first proportion of the amount of the first light beam to the total of the amount of the first light beam and the amount of the second light beam and the second proportion of the amount of the second light beam to the total to produce the image indicating the relationship between the amount of the third light beam and at least one selected from the group consisting of the first proportion and the second proportion. An apparatus according to another aspect of the present disclosure includes an optical filter including a first region and a second region; a first optical detector, provided for the first region, for determining a first amount of a first light beam passed through the first region; and a second optical detector, provided for the second region, for determining a second amount of a second light beam passed through the second region. In the apparatus, a spectral transmission curve of the first region has a first center wavelength, a first transmission range and a first width at half maximum, a spectral transmission curve of the second region has a second center wavelength, a second transmission range and a second width at half maximum, the first and second transmission ranges are located between a first wavelength and a second wavelength, and the first width at half maximum is different from the second width at half maximum. The apparatus according to another aspect of the present disclosure further includes a first light source for emitting a first light beam having the first wavelength as a center wavelength, and a second light source for emitting a second light beam having the second wavelength as a center wavelength.

Eighteenth Aspect

In a method of detecting light according to the eighteenth aspect, a first light beam having a first wavelength as a center wavelength is applied to an object. A second light beam having a second wavelength as a center wavelength longer than the first wavelength is applied to the object. A third light beam produced by the first light beam and the second light beam each passed through or reflected by the object is allowed to transmit through an optical filter including a first region and a second region. A first amount of a first part of the third light beam passed through the first region is determined. A second amount of a second part of the third light beam passed through the second region is determined. A spectral transmission curve of the first region has a first center wavelength, a first transmission range and a first width at half maximum. A spectral transmission curve of the second region has a second center wavelength, a second transmission range and a second width at half maximum. The first and second transmission ranges are located between the first wavelength and the second wavelength. The first width at half maximum is different from the second width at half maximum.

Nineteenth Aspect

In a method of detecting light according to the nineteenth aspect, a first light beam having a first wavelength as a center wavelength is applied to an object. A second light beam having a second wavelength as a center wavelength longer than the first wavelength is applied to the object. A third light beam produced by the first light beam and the second light beam each passed through or reflected by the object is allowed to transmit through an optical filter. The optical filter has a spectral transmission curve, of which range of transmission is longer than the first wavelength and shorter than the second wavelength. Intensity of the first light beam and intensity of the second light beam are varied to determine an amount of the third light beam passed through the optical filter.

In the present disclosure, all or a part of any of circuit, unit, device, part or portion, or any of functional blocks in the block diagrams may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part, or portion can be implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Hereinafter, embodiments are described in detail with reference to the drawings.

First Embodiment

Figure 1A:
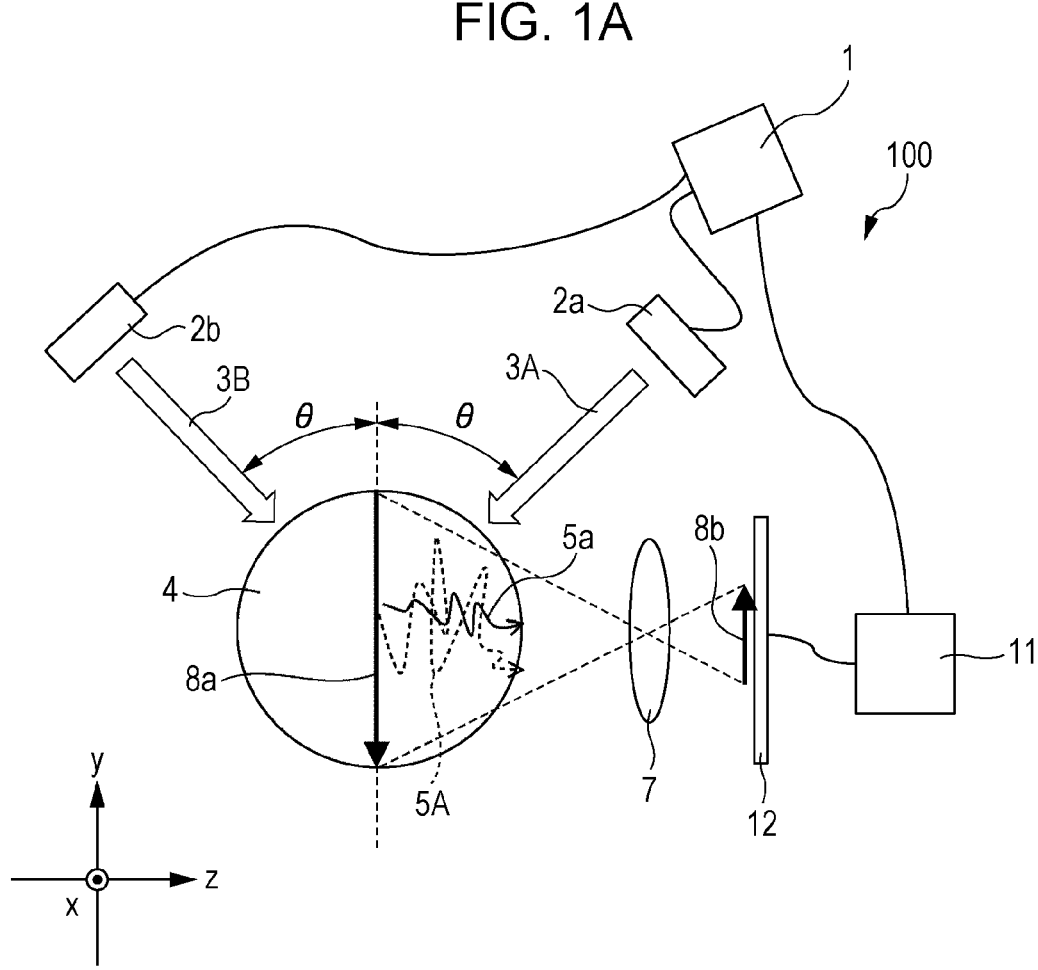
FIG. 1A is a schematic cross-sectional view illustrating a photodetection system according to a first embodiment.

FIG. 1A is a schematic view illustrating a photodetection system 100 according to an embodiment. The photodetection system 100 includes light sources 2a and 2b, a condenser lens 7, a photodetection apparatus 12, controlling circuitry 1, and processing circuitry 11.

The light sources 2a and 2b simultaneously apply light beams 3A and 3B having different wavelengths (or with a small phase difference) to an object 4. The light source 2a emits a laser beam having a center wavelength of $\lambda_0-\alpha$, and the light source 2b emits a laser beam having a center wavelength of $\lambda_0+\alpha$, for example. The light sources 2a and 2b may continuously emit a light beam at a constant intensity, or may emit a pulsed light beam. The wavelength $\lambda_0$ may be any wavelength. If the object 4 is a living organism, the wavelength $\lambda_0$ may be set within a range of about 650 nm to about 950 nm, for example. This wavelength range falls in a range from red light to near infrared light. Herein, the term "light" includes not only a visible light but also an infrared light.

As illustrated in FIG. 1A, the object 4 is positioned with respect to the light sources 2a and 2b such that the light beams 3A and 3B emitted from the light sources 2a and 2b, respectively, are applied to a planar body 8a, which is a target layer of the object 4 to be visualized, at an equal angle θ. Specifically, if the body 8a is positioned on an x-y plane, the light beam 3A is applied to the body 8a from a positive side of a z-axis, and the light beam 3B is applied to the body 8a from a negative side of the z-axis.

As is described in detail below, the application of the light beams 3A and 3B to the object 4 produce scattered light beams 5a and 5A on a surface or inside the object 4. The condenser lens 7 is positioned on the z-axis with respect to the body 8a so as to collect the scattered light beams 5a and 5A. The collected light beams form an image 8b on an imaging plane of the condenser lens 7. In the example illustrated in the drawings, the condenser lens 7 includes one lens, but may include a plurality of lenses.

The photodetection apparatus 12 is positioned on the imaging plane of the condenser lens 7 on the z-axis. The photodetection apparatus 12 is configured to detect the scattered light beams 5a and 5A collected by the condenser lens 7. The structure of the photodetection apparatus 12 is described in detail later.

The processing circuitry 11 is configured to perform an arithmetic operation on signals detected by the photodetection apparatus 12. In addition, the processing circuitry 11 generates image data to be displayed on a display, for example, based on the result of the arithmetic operation. The processing circuitry 11 may be image processing circuitry such as a digital signal processor (DSP).

The controlling circuitry 1 is configured to control the detection of light performed by the photodetection apparatus 12, the arithmetic operation performed by the processing circuitry 11, the amount of light emitted by the light sources 2a and 2b, timing of lighting, and continuous lighting time, when a program in a memory is executed, for example. The controlling circuitry 1 may be an integrated circuit such as a central processing unit (CPU) or a microcomputer. The controlling circuitry 1 and the processing circuitry 11 may be one circuitry integrally including the controlling circuitry 1 and the processing circuitry 11.

The photodetection system 100 may include a display (not illustrated) that displays a result of the arithmetic operation performed by the processing circuitry 11.

Figure 1B:
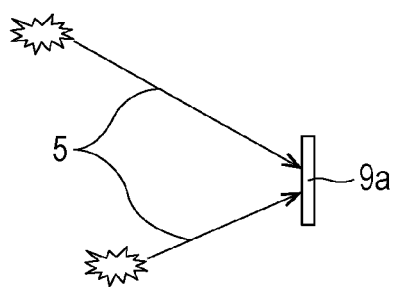
FIG. 1B illustrating a state of scattered light entering one opening of a photodetector in the photodetection system according to the first embodiment.
Figure 2A:
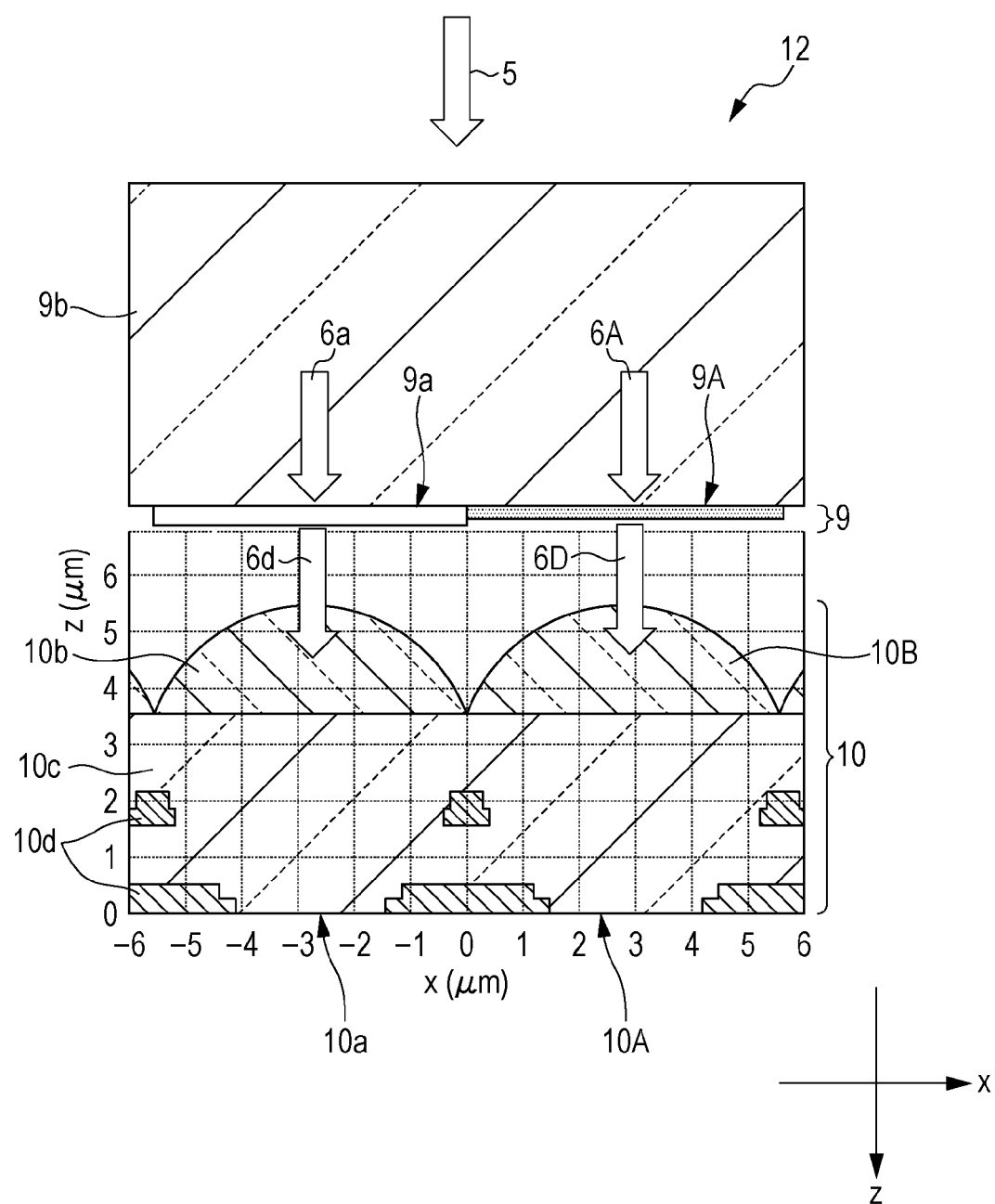
FIG. 2A is a cross-sectional view illustrating the photodetection apparatus according to the first embodiment.
Figure 2B:
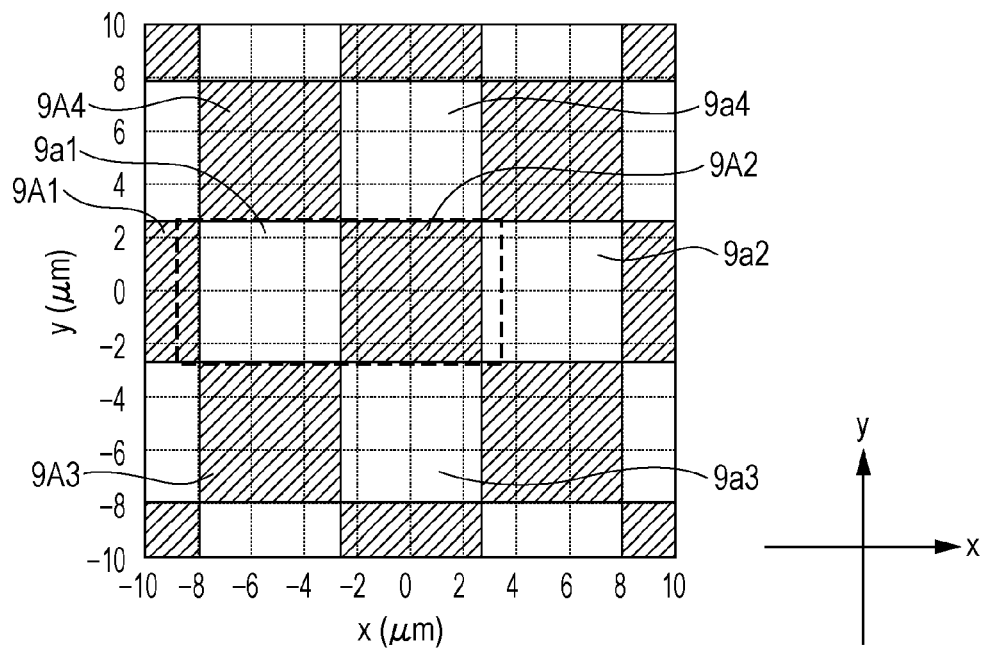
FIG. 2B is a plan view illustrating the photodetection apparatus according to the first embodiment, the photodetector being viewed from a light incident side.

FIG. 1B illustrates a scattered light beam 5 entering an opening of the photodetection apparatus 12. The opening corresponds to a region 9a or 9A, for example, which is described later. FIG. 2A and FIG. 2B illustrate a configuration of the photodetection apparatus 12. The coordinates (x, y, and z-axes) in FIGS. 2A and 2B correspond to those in FIG. 1A and those in the other figures. FIG. 2B is a plan view illustrating a light incident side (negative side of the z-axis) of the photodetection apparatus 12. FIG. 2A is a cross-sectional view illustrating the photodetection apparatus 12 taken along an incident direction of light (cross-sectional view including an area encircled by a broken line in FIG. 2B and taken along an x-z plane). FIG. 2B is a plan view taken along an x-y plane including two types of bandpass filters, which are described later. The structure illustrated in the cross-sectional view in FIG. 2A is used as one unit, and the unit is periodically arranged in the x-y plane.

The photodetection apparatus 12 includes a photodetection layer 10 and an optical filter 9. Light passed through the optical filter 9 enters the photodetection layer 10. In the example illustrated in FIG. 2A, the photodetection layer 10 and the optical filter 9 are stacked in the z-direction. In the example illustrated in FIG. 2A, the optical filter 9 is disposed on a transparent board 9b.

The photodetection layer 10 includes a plurality of detectors 10a and 10A arranged in two dimensions in an in-plane direction (in the x-y plane) of the photodetection layer 10. The detectors 10a and 10A are configured to output electrical signals in accordance with the amount of entered light. The photodetection layer 10 includes, from the light incident side, a micro lens 10b (10B), a transparent film 10c, a metal film 10d such as wiring, and photosensitive portions formed of Si or an organic film, for example. The photosensitive portions positioned in spaces of the metal film 10d correspond to the detectors 10a and 10A. The micro lens 10b and 10B are positioned so as to face a corresponding one of the detectors 10a and 10A. The detectors 10a and 10A detect light entered the spaces of the metal film 10d after collected by the micro lens 10b and 10B.

Figure 2C:
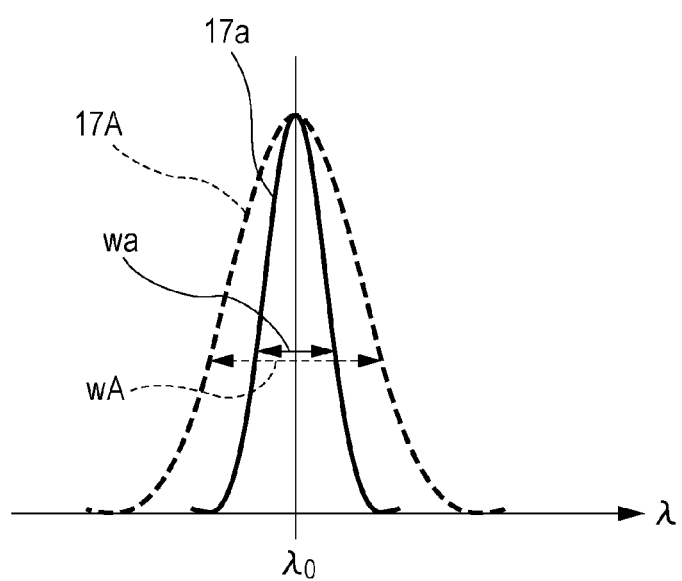
FIG. 2C is a view indicating a transmittance characteristic of an optical filter of the photodetection apparatus according to the first embodiment.

The optical filter 9 is a bandpass filter having a center transmission wavelength of $\lambda_0$. The optical filter 9 includes two separated regions (first region and second region) in the x-y plane so as to correspond to the detectors 10a and 10A. FIG. 2C illustrates transmittance characteristics of the regions 9a and 9A of the optical filter 9. Transmittance characteristics (spectral transmission curves) 17a and 17A of the respective regions 9a and 9A have center wavelength of $\lambda_0$ However, a width at half maximum wa (full width at half maximum) of the transmittance characteristic 17a of the region 9a is smaller than a width at half maximum wA (full width at half maximum) of the transmittance characteristic 17A of the region 9A. In other words, the transmittance characteristics 17a and 17A differ from each other. The optical filter 9, which has the transmittance characteristic 17a having a relatively small width at half maximum wa and the transmittance characteristic 17A having a relatively large width at half maximum wA, may be obtained by a method including forming a bandpass filter that includes a multilayered structure and has a small width at half maximum of the transmittance characteristic, and then etching portions of the bandpass filter so as to have a larger width at half maximum of the transmittance characteristic. The bandpass filter may be formed by staking alternately a transparent film having a high refractive index, which is formed of $TiO_2$ or $Ta_2O_5$, for example, and a transparent film having a low refractive index, which is formed of $SiO_2$ or MgF, for example.

A gap between the optical filter 9 and the photodetection layer 10 may be small. The optical filter 9 and the photodetection layer 10 may be in close contact with each other. A transparent medium such as an adhesive may fill the gap (including a space between the micro lenses 10b and 10B). In the case that the filling with the transparent medium is performed, the micro lenses 10b and 10B may be formed of a material having a sufficiently larger refractive index than the transparent medium filling the gap such that the micro lenses 10b and 10B have sufficient lens effect.

The region 9a in FIG. 2A corresponds to regions 9a1, 9a2, 9a3, or 9a4, for example, in FIG. 2B, and the region 9A in FIG. 2A corresponds to regions 9A1, 9A2, 9A3, or 9A4, for example, in FIG. 2B. In other words, the optical filter 9 includes a plurality of regions 9a and a plurality of regions 9A in an in-planer direction (x-y plane). Each of the regions 9a faces a corresponding one of the detectors 10a and each of the regions 9A faces a corresponding one of the detectors 10A. The regions 9A (9A1 to 9A4) form a checker board pattern (see FIG. 2B). The regions 9A (9A1 to 9A4) may form a pattern other than the checker board pattern, and may form a stripe pattern, for example. The regions 9a (9a1 to 9a4) also forms a checker board pattern or stripe pattern, for example. In other words, each of the regions 9A is adjacent to one of the regions 9a.

The transparent board 9b is disposed on the light incident side of the optical filter 9. The transparent board 9b is formed of $SiO_2$, for example.

The light beam 5 entered the photodetection apparatus 12 passes through the transparent board 9b, and the light beam 5 as light beams 6a and 6A reaches the regions 9a and 9A each including the bandpass filter. The light beam 6a passed through the region 9a becomes a light beam 6d, which has a narrow width at half maximum of the wavelength, and enters the micro lens 10b so as to be detected by the detector 10a. The light beam 6A passed through the region 9A becomes a light beam 6D, which has a wide width at half maximum of the wavelength, and enters the micro lens 10B so as to be detected by the detector 10A.

The regions 9A and 9A each correspond to the opening illustrated in FIG. 1B. The light beams passed through the regions 9a and 9A are detected by the detectors 10a and 10A positioned directly below the regions 9a and 9A. Amounts of the light beams detected by the detectors each facing a corresponding one of the regions 9a1, 9a2, 9a3, and 9a4 illustrated in FIG. 2B are defined as q1, q2, q3, and q4. Amounts of the light beam detected by the detectors each facing a corresponding one of the regions 9A1, 9A2, 9A3, and 9A4 illustrated in FIG. 2B are defined as Q1, Q2, Q3, and Q4. The amounts q1 to q4 each represent the amount of detected light beam having a narrow width at half maximum of wavelength. The amounts Q1 to Q4 each represent the amount of detected light beam having a wide width at half maximum of wavelength.

The detector positioned directly below the region 9a1 does not detect the light beam having a wide width at half maximum of the wavelength, and the detector positioned directly below the region 9A2 does not detect the light beam having a narrow width at half maximum of the wavelength. The detected amount of the light beam having a wide width at half maximum of the wavelength is defined, at the detection position directly below the region 9a1, as Q0=(Q1+Q2+Q3+Q4)/4 (or Q0=(Q1+Q2)/2), and the detected amount of the light beam having a narrow width at half maximum of the wavelength is defined, at the detection position directly below the region 9A2, as q0=(q1+q2+q3+q4)/4 (or q0=(q1+q2)/2). In other words, an average of the amounts of the detected light beams at the detection positions directly below regions adjacent to a certain region in the x-direction and/or the y-direction is defined. Application of the definitions to every region enables the amount of the detected light beam having the narrow width at half maximum of the wavelength and the amount of the detected light beam having the wide width at half maximum of the wavelength to be determined for each of the photodetection regions, which make up the photodetection layer 10 (all detectors included in the photodetection layer 10). In other words, the amount of the detected light beam having the narrow width at half maximum of the wavelength and the amount of the detected light beam having the wide width at half maximum of the wavelength are determined for the same position of the detector, i.e., the same pixel. The processing circuitry 11 executes arithmetic operation including defining the amount of the detected light beam having the narrow width at half maximum of the wavelength and the amount of the detected light beam having the wide width at half maximum of the wavelength as described above for each of the detectors, which make up the photodetection layer 10, calculating a ratio between the defined amounts for each detector, and assigning the calculated values to the pixels corresponding to the detectors to generate an image.

In this embodiment, the amounts q0 and Q0 at the same pixel are determined by the above-described interpolation operation, but another interpolation operation may be used to determine the amount of the detected light beam having the wide width at half maximum of the wavelength and the amount of the detected light beam having the narrow width at half maximum of the wavelength at the same pixel. Alternatively, the amounts q0 and Q0 may be determined without the interpolation operation. The region 9a1 and the region 9A1 in FIG. 2B may be regarded as one pixel, and the amount of the light beam detected in the region 9a1 and the amount of the light beam detected in the region 9A1 may be used as the amount of the detected light beam having the narrow width at half maximum of the wavelength and the amount of the detected light beam having the wide width at half maximum of the wavelength.

Figure 3A:
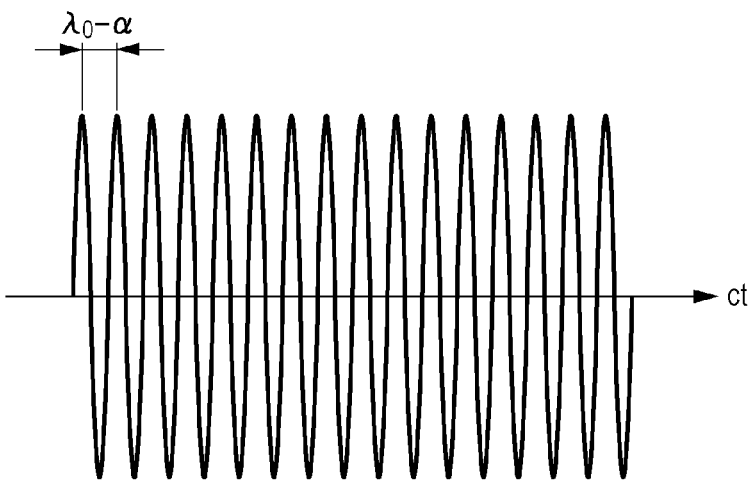
FIG. 3A illustrates how light beating occurs in the first embodiment.
Figure 3B:
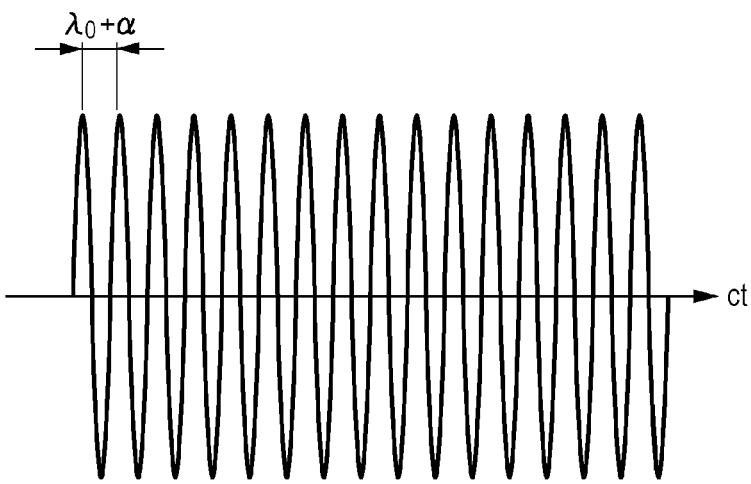
FIG. 3B illustrates how light beating occurs in the first embodiment.
Figure 3C:
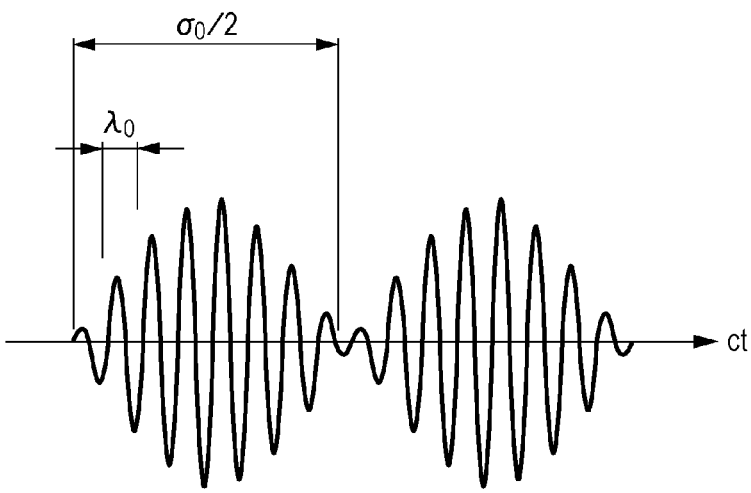
FIG. 3C illustrates how light beating occurs in the first embodiment.

FIGS. 3A to 3C illustrate how light beating occurs in the first embodiment. The light beams 3A and 3B emitted from the light sources 2a and 2b become the scattered light beams 5a and 5A at the surface and inside the object 4 and enters the photodetection apparatus 12 located at the imaging plane of the condenser lens 7 (on the optical filter 9). The two light beams overlap at the imaging plane of the condenser lens 7 and interfere with each other. FIG. 3A and FIG. 3B are views illustrating waveforms of the light beams 5a and 5A before entering the photodetection apparatus 12 and before interfering with each other. The amplitudes of the light beams 5a and 5A are represented by Equation 1 and Equation 2, respectively, by using the definitions indicated in Equation 3 and Equation 4.

$$u = a\sin\left\{\left(\omega_0 + \frac{\omega_0 \alpha}{\lambda_0 - \alpha}\right)t\right\} \quad \text{(Equation 1)}$$

$$v = b\sin\left\{\left(\omega_0 - \frac{\omega_0 \alpha}{\lambda_0 + \alpha}\right)t\right\} \quad \text{(Equation 2)}$$

$$\omega_0 = 2\pi c / \lambda_0 \quad \text{(Equation 3)}$$

$$\sigma_0 = \omega_0 \alpha / (\lambda_0 + \alpha) \quad \text{(Equation 4)}$$

If the light beams are superposed, Equations 5, 6, and 7 are established.

$$u + v = A\sin(\omega_0 t + \gamma) \quad \text{(Equation 5)}$$

$$A = \sqrt{a^2 + b^2 + 2ab\cos(2\sigma_0 t)} \quad \text{(Equation 6)}$$

$$\tan\gamma = \frac{a-b}{a+b}\tan(\sigma_0 t) \quad \text{(Equation 7)}$$

In particular, if the amplitude of the light beam 5a and the amplitude of the light beam 5A are equal (a=b), Equation 8 is established. FIG. 3C indicates the waveform of the light beams superposed under such a condition.

$$u+v=2a\cos\sigma_0 t \sin\omega_0 t \quad \text{(Equation 8)}$$

FIG. 3C illustrates a waveform indicating how light beating occurs. The light beating (modulated wave) has a cycle of $\sigma_0/2$ (substantially proportional to a difference between two wavelengths). The wavelength of the carrier wave is $\lambda_0$ (intermediate value between two wavelengths).

Figure 4A:
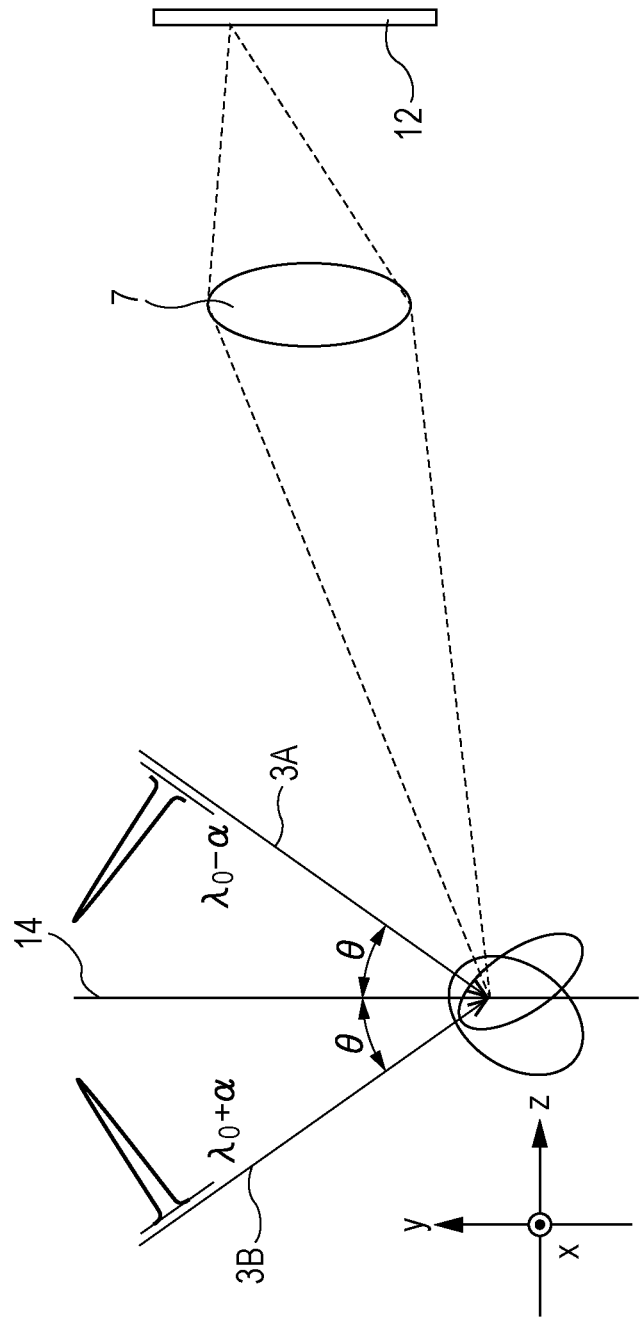
FIG. 4A illustrates how light scattered in the object enters a detection surface in the first embodiment.
Figure 4B:
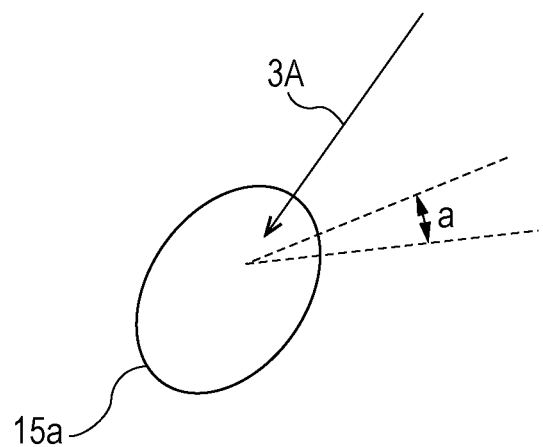
FIG. 4B illustrates how the light scattered in the object enters the detection surface in the first embodiment.
Figure 4C:
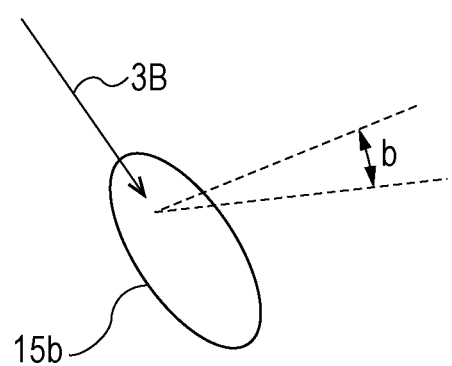
FIG. 4C illustrates how the light scattered in the object enters the detection surface in the first embodiment.

FIGS. 4A to 4C are views schematically illustrating a state in which the light beams scattered in the object enter a detection surface of the photodetection apparatus 12 in the first embodiment.

A traveling direction of the light beam 3A from the light source 2a and a traveling direction of the light beam 3B from the light source 2b are symmetrical with respect to a plane 14. The light beams 3A and 3B both enter the plane 14 at an angle of θ. Here, as illustrated in FIG. 1A, the plane 14 where the body 8a is positioned is a target layer of the object 4 to be visualized. The light beams scattered in the body 8a is finally collected by the condenser lens 7, and detected by the photodetection apparatus 12. The photodetection apparatus 12 positioned at the imaging plane of the condenser lens 7 is substantially parallel to the plane 14.

Since the scattering is repeated in the object, it cannot be determined if the scattering is forward scattering or backscattering by observation of only one scattering. However, in view of positional relationship between the substantive body 8a and the condenser lens 7, the scattering of the light beam 3A is considered as backscattering (at least backscattering occurs often) and the scattering of the light beam 3B is considered as forward scattering (at least forward scattering occur often). According to Mie scattering theory, a scattering direction (scattering intensity pattern) of light depends on an incident direction, a wavelength, and a scattering particle diameter. According to Mie scattering theory, the forward scattering rapidly increases as the diameter of the particle increases with respect to the wavelength of the light, for example.

FIG. 4B is a view schematically illustrating a scattering intensity distribution 15a of the scattered light beam 5a of the light beam 3A having the wavelength of $\lambda_0-\alpha$. FIG. 4C is a view schematically illustrating a scattering intensity distribution 15b of the scattered light beam 5A of the light beam 3B having the wavelength of $\lambda_0+\alpha$. The amplitude a of the scattered light beam 5a traveling toward the condenser lens 7 is different from an amplitude b of the scattered light beam 5A traveling toward the condenser lens 7. The amplitudes a and b correspond to a and b in Equations 1 and 2.

Figure 5A:
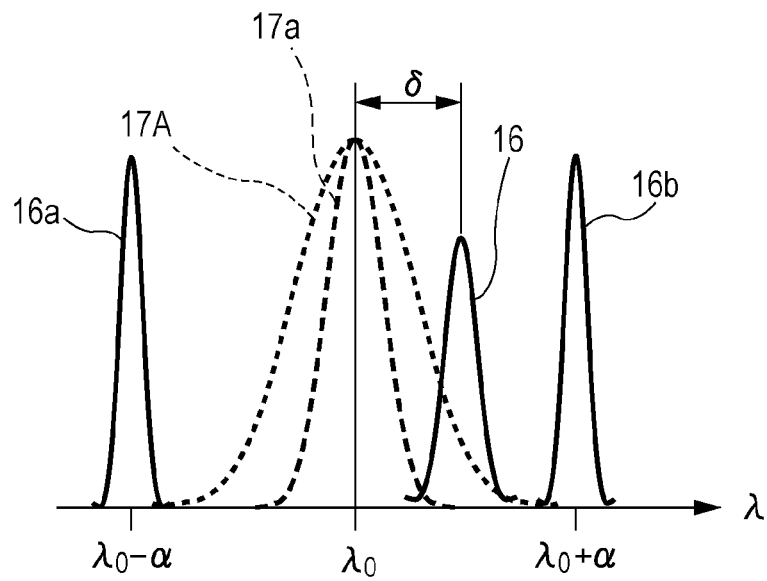
FIG. 5A indicates a relationship between a wavelength of an interference light beam caused by beating and a transmittance characteristic of the optical filter in the first embodiment.

FIG. 5A indicates a relationship between the wavelength of the interference light beam caused by the beating and the transmittance characteristic of the optical filter in the first embodiment. FIG. 5A indicates the transmittance characteristic 17a (wavelength dependence of the transmittance) of the region 9a of the optical filter 9, the transmittance characteristic 17A of the region 9A of the optical filter 9, a wavelength distribution 16a of the light beam 3A, a wavelength distribution 16b of the light beam 3B, and a wavelength distribution 16 of the interference light beam produced by interference between the light beam 3A and the light beam 3B. As indicated by the wavelength distribution 16, which is based on Equation 5, the wavelength of the interference light beam (carrier wave) is between $\lambda 0-\alpha$ and $\lambda 0+\alpha$.

The transmittance characteristics 178 and 17A of the regions 9a and 9A of the optical filter 9 do not overlap the wavelength distributions 16a and 16b of the light beams 3A and 3B. Thus, unless the light beams 3A and 3B interfere with each other, the light beams 3A and 3B do not pass through the regions 9a and 9A of the optical filter 9 and do not enter the detectors.

The wavelength of the interference light beam (carrier wave) is determined by the ratio between the amplitude a of the scattered light beam 5a and the amplitude b of the scattered light beam 5A. If a=b is true, the wavelength of the interference light beam is $\lambda_0$ which is an intermediate wavelength between $\lambda_0-\alpha$ and $\lambda_0+\alpha$. The amount of the transmitted light passed through the optical filter is a product of the wavelength distribution 16 and the transmittance characteristic 178 or 17A. Thus, in order to estimate the center wavelength ($\lambda_0+\delta$) of the wavelength distribution 16, the interference light beam of the scattered light beam 5a and the scattered light beam 5A is passed through the region 9a of the optical filter 9 having the transmittance characteristic 17a (narrow width at half maximum) and through the region 9A of the optical filter 9 having the transmittance characteristic 17A (wide width at half maximum) such that the photodetection apparatus 12 determines the amount of light q0 (first amount) and the amount of light Q0 (second amount), and the ratio (q0/Q0) between the amount q0 and the amount Q0 is calculated.

The estimation of the wavelength $\lambda_0+\delta$ enables the ratio between the amplitude a and the amplitude b to be determined by using the relationship indicated in Equation 5, and enables the scattering intensity pattern information about the substantive object to be determined. If the ratio between the amounts of light (q0/Q0) is 1, for example, it is estimated that $\delta=0$ is true, and it is calculated to be a=b by using Equation 5. As a result, the scattering in the substantive object is estimated as substantially isotropic scattering.

The processing circuitry 11 calculates the ratio (q0/Q0) between the amount q0 and the amount Q0 for every pixel of the photodetection apparatus 12. The processing circuitry 11 may further generate distribution image data represented by gradation or color tone corresponding to the ratio for every pixel.

The processing circuitry 11 may generate distribution image data for every pixel by using the amount of the detected light beam Q0 having a wide width at half maximum of the wavelength, the amount of the detected light beam q0 having a narrow width at half maximum, and the sum, product or average of the amounts Q0 and q0, which is a value obtained by using the two amounts of the detected light beam. The distribution image data may be displayed as an image indicating the scattering intensity of the target layer of the object 4 to be observed. In addition, the product of the above-described ratio and the amount of the detected light beam such as the amount of light q0 or Q0 may be calculated to generate image data.

Furthermore, the operation circuitry 11 may generate the above-described distribution image data and another distribution image data. The above-described distribution image data is generated by using the amount Q0 and the amount q0 determined by the detectors in which the ratio between the amount q0 and the amount Q0 is equal to or larger than a predetermined threshold value. The other distribution image data is generated by using the amount Q0 and the amount q0 determined by the detectors in which the ratio is smaller than the predetermined threshold value. With this configuration, a plurality of images are obtained for portions of the scatterer having similar characteristics in the target layer of the object 4 to be observed. The threshold value may include two or more threshold values to generate two or more kinds of distribution image data.

As described above, this embodiment includes applying two light beams to the object, generating the interference light beam of the light beams passed through or reflected by the object, allowing the interference light beam to transmit through the optical filter having the first region and the second region, which have different widths at half maximum of the spectral transmission curve, and determining the first and second amounts of the light beams passed through the first and second regions, respectively. With this configuration, the center wavelength of the interference light beam is able to be estimated by the ratio between the first amount and the second amount, and the ratio between the forward scattering and the backscattering in the object is also able to be estimated. Thus, the scattering intensity pattern information of the object, i.e., information about particle properties of the object or scattering characteristic, is obtained.

The plane 14, which is a target layer of the object 4 to be visualized, corresponds to a plane of symmetry of the light beam 3A and the light beam 3B. In particular, if the light beams 3A and 3B are pulsed light beams and are emitted to cross each other, only one plane of symmetry exists in the space. If pulsed light beams are emitted periodically, a plurality of planes of symmetry is formed at intervals corresponding to the pulse period, but only one plane of symmetry exists in the depth of field of the condenser lens 7. The position of the plane of symmetry is shifted in a normal direction (z-direction in FIG. 4A) of the plane of the symmetry by displacing the phase relationship of the pulsed light beams.

When at least one of the above-described amount q0 and the amount Q0 is detectable, the beating due to the interference between the light beam 3A and the light beam 3B is caused. The original light causing the beating is the scattered light traveling from a single plane of symmetry in the object. In other words, the information about intensity at a certain depth in the object and the scattering intensity pattern information have been already obtained. As described above, the scattered intensity pattern information is obtained in addition to the intensity information in the present embodiment, while only the intensity information about the scattered light at a particular depth is determined in the example of the related art. The combination of the intensity information and the scattered intensity pattern information enables the information about the inside of the object to be precisely determined.

In the above-described example, the optical filter 9 includes the separated two regions 9a and 9A. However, the optical filter 9 may include three or more separated regions. In such a case at least one of the separated regions may have a center wavelength of the transmission characteristic away from $\lambda_0$. It is able to be determined whether the center wavelength of the wavelength distribution 16 is displaced to a positive side or a negative side by using output signals from the detector corresponding to the region.

Second Embodiment

The second embodiment is different from the first embodiment only in the pattern of the optical filter, and the other structures are the same as those in the first embodiment. Components of the second embodiment same as those in the first embodiment are assigned the same reference numerals as those of the first embodiment, and are not described in detail.

Figure 6A:
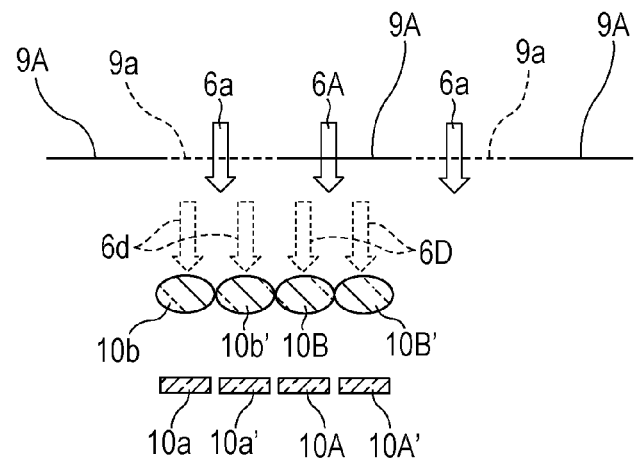
FIG. 6A is a schematic cross-sectional view of a photodetection apparatus according to a second embodiment.
Figure 6B:
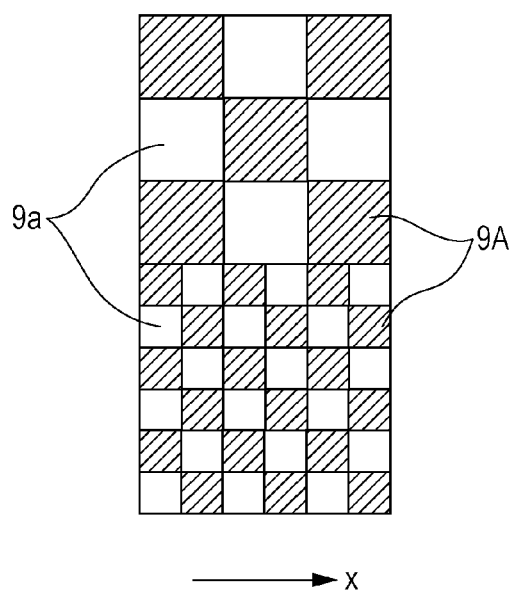
FIG. 6B is a schematic cross-sectional view illustrating another embodiment.
Figure 6C:
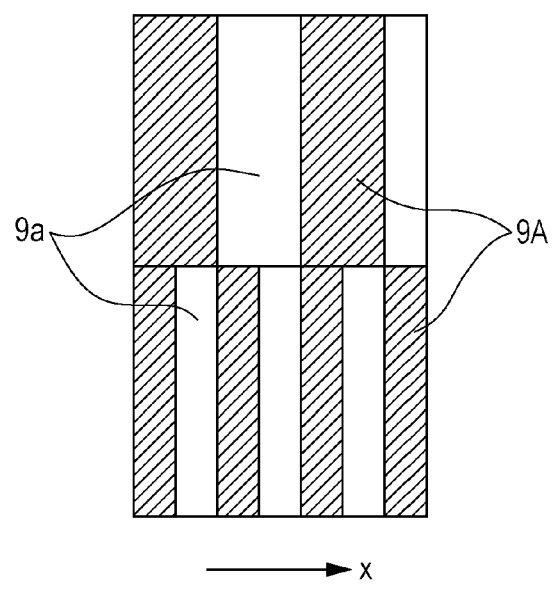
FIG. 6C is a schematic cross-sectional view illustrating another embodiment.

FIG. 6A is a view illustrating a configuration in which the optical filter has a pattern different from that of the first embodiment. In the first embodiment, one micro lens 10b (or 10B) and one detector 10a (or 10B) are provided for the region 9a (or the region 9A). In the second embodiment, two micro lenses 10b and 10b' (or 10B and 10B') and two detectors 10a and 10a' (or 10A and 10A') are provided for the region 9a (or the region 9A). The detectors 10a and 10a (or 10A and 10A') are electrically connected to each other. Three or more micro lenses 10b (or 10B) and three or more detectors 10a (or 10A) may be provided for the region 9a (or the region 9A). The regions 9a and 9A may have patterns having different pitches. In FIG. 6B, the region 9a (or the region 9A) includes two checker board patterns having different pitches, for example. In FIG. 6C, the region 9a (or the region 9A) includes two stripe patterns having different pitches, for example. In any case, the number of the micro lenses and the number of the detectors provided for one region 9a (or the region 9A) is larger in the pattern having a large pitch than in the pattern having a small pitch. In the pattern having a small pitch, one micro lens and one detector are provided in the x-axis direction for one region 9a (or the region 9A), for example. In the pattern having a large pitch, two micro lenses and two detectors are provided in the x-axis direction for one region 9a (or the region 9A), for example.

Third Embodiment

The third embodiment is different from the first embodiment in that the optical filter 9 is uniform and have no pattern. Components of the third embodiment except for the optical filter 9 are identical to those of the first embodiment. The components identical to those of the first embodiment are assigned the same reference numerals as those in the first embodiment, and are not described in detail. An optical filter 9 of this embodiment is a uniform bandpass filter having a wavelength of $\lambda_0$ as the center wavelength of the transmission characteristic.

Figure 5B:
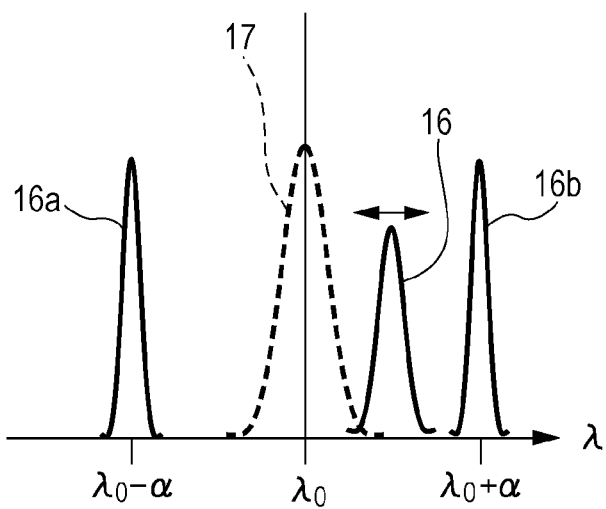
FIG. 5B indicates a relationship between a wavelength of an interference light beam caused by beating and a transmittance characteristic of the optical filter in a third embodiment.

FIG. 5B indicates a relationship between the wavelength of the interference light beam produced by beating and the transmittance characteristics of the optical filter in the third embodiment. FIG. 5B indicates the transmittance characteristic 17 of the optical filter 9, the wavelength distribution 16a of the light beam 3A, the wavelength distribution 16b of the light beam 3B, and the wavelength distribution 16 of the interference light beam produced by interference between the light beam 3A and the light beam 3B. As in the first embodiment, as indicated by the wavelength distribution 16, which is based on Equation 5, the wavelength of the interference light beam (carrier wave) is between $\lambda_0 - \alpha$ and $\lambda_0 + \alpha$.

The transmittance characteristic 17 of the optical filter 9 does not overlap the wavelength distributions 16a and 16b of the light beams 3A and 3B. Thus, unless the light beams 3A and 3B interfere with each other, the light beams 3A and 3B do not pass through the optical filter 9 and do not enter the detectors.

The wavelength of the interference light beam (carrier wave) is determined by a ratio between the amplitudes a and b of the scattered light beams 5a and 5A. If a=b is true, for example, the wavelength of the interference light is $\lambda_0$ which is an intermediate wavelength between $\lambda_0 - \alpha$ and $\lambda_0 + \alpha$. If the amplitude a is larger than the amplitude b, the wavelength of the interference light beam is closer to a side of $\lambda_0 - \alpha$. If the amplitude b is larger than the amplitude a, the wavelength of the interference light beam is closer to a side of $\lambda_0 + \alpha$.

The amount of the light beam which has passed through the optical filter is a product of the wavelength distribution 16 and the transmittance characteristic 17. Thus, the ratio between the amplitudes a and b is reflected in the image distribution determined by the photodetection apparatus 12. The amplitudes a and b are proportional to the output intensity of the light sources 2a and 2b, respectively. Thus, the measurement information about the scattering intensity pattern of the object is obtained by adjusting the output intensity of the light sources 2a and 2b to obtain an image distribution by using the ratio between the output intensity of the light source 2a and that of the light source 2b as a parameter and analyzing the obtained image distribution. To adjust the output intensity of the light sources 2a and 2b, the ratio of the output intensity between the light sources 2a and 2b may be varied on the condition that the sum of the output intensity of the light source 2a and the output intensity of the light source 2b is constant, the output intensity of the light source 2b may be varied on the condition that the output intensity of the light source 2a is constant, or the output intensity of the light source 2a may be varied on the condition that the output intensity of the light source 2b is constant.

The operation circuitry 11 calculates the amount of the detected light beam for every pixel of the photodetection apparatus 12. The operation circuitry 11 may further generate distribution image data represented by gradation or color tone corresponding to the ratio between the output intensity of the light source 2a and that of the light source 2b, for example, for each of the pixels.

As described above, this embodiment includes applying the light beams having two different wavelengths to the object to generate the inference light beam of the light beams passed through or reflected by the object, transmitting the interference light beam through the uniform optical filter to determine the amount of the transmitted light. This enables the center wavelength of the interference light beam to be estimated by the amount of the detected light beam, and enables the ratio between the forward scattering and the backscattering in the object to be estimated. Thus, the scattering intensity pattern information about the object, i.e., the information about the particle properties or the scattering characteristics of the object, is obtained. In addition, as in the first embodiment, a pulse light source may be used to analyze the information about the cross section of the inside of the object with high accuracy and high resolution.

What is claimed is:

1. A photodetection apparatus comprising:
   a first light source configured to apply a first light beam having a first wavelength as a center wavelength to an object;
   a second light source configured to apply a second light beam having a second wavelength as a center wavelength longer than the first wavelength to the object;
   an optical filter that includes a first region and a second region and is configured to transmit a third light beam produced by the first light beam and the second light beam each passed through or reflected by the object;
   a first optical detector configured to determine a first amount of a first part of the third light beam passed through the first region; and
   a second optical detector configured to determine a second amount of a second part of the third light beam passed through the second region, wherein:
   a spectral transmission curve of the first region has a first center wavelength, a first transmission range and a first width at half maximum;
   a spectral transmission curve of the second region has a second center wavelength, a second transmission range and a second width at half maximum;
   the first and second transmission ranges are located between the first wavelength and the second wavelength; and
   the first width at half maximum is different from the second width at half maximum.

2. The photodetection apparatus according to claim 1, wherein the first center wavelength is equal to the second center wavelength.

3. The photodetection apparatus according to claim 1, wherein each of the first light beam and the second light beam is a pulsed light beam.

4. The photodetection apparatus according to claim 1, wherein the first light source is configured to apply the first light beam to a target surface of the object at a certain incident angle from one side of the target surface of the object, and
   the second light source is configured to apply the second light beam to the target surface of the object at the certain incident angle from another side of the target surface.

5. The photodetection apparatus according to claim 1, wherein the third light beam is an interference light beam produced by interference between the first light beam and the second light beam.

6. The photodetection apparatus according to claim 1, wherein:
   a plurality of first regions are provided in the optical filter, each of the plurality of first regions being the first region,
   a plurality of second regions are provided in the optical filter, each of the plurality of second regions being the second region,
   a plurality of first optical detectors are provided in the photodetection apparatus, each of the plurality of first optical detectors being the first optical detector,
   a plurality of second optical detectors are provided in the photodetection apparatus, each of the plurality of second optical detectors being the second optical detector,
   each of the plurality of first regions and each of the plurality of second regions are alternately arranged in plan view,
   each of the plurality of first optical detectors and each of the plurality of second optical detectors are alternately arranged in plan view,
   each of the plurality of first regions faces at least one of the plurality of first optical detectors in plan view, and
   each of the plurality of second regions faces at least one of the plurality of second optical detectors in plan view.

7. The photodetection apparatus according to claim 6, wherein the plurality of first regions are arranged in a stripe pattern or a checker board pattern in plan view.

8. The photodetection apparatus according to claim 6, further comprising processing circuitry configured to calculate, for each of the plurality of first optical detectors, a ratio between the first amount and the second amount determined by one of the plurality of second optical detectors adjacent to a corresponding one of the plurality of first optical detectors, to produce an image indicating a distribution of ratios in plan view.

9. The photodetection apparatus according to claim 6, further comprising processing circuitry configured to calculate, for each of the plurality of first optical detectors, at least one selected from the group consisting of a first proportion of the first amount to a total of the first amount and the second amount determined by one of the plurality of second optical detectors adjacent to a corresponding one of the plurality of first optical detectors and a second proportion of the second amount to the total, to produce an image indicating a distribution of at least one selected from the group consisting of the first proportion and the second proportion.

10. The photodetection apparatus according to claim 1, further comprising processing circuitry configured to calculate a ratio between the first amount and the second amount.

11. The photodetection apparatus according to claim 1, further comprising processing circuitry configured to calculate at least one selected from the group consisting of a first proportion of the first amount to a total of the first amount and the second amount and a second proportion of the second amount to the total.

12. The photodetection apparatus according to claim 1, wherein
the first center wavelength is different from the first wavelength and the second wavelength,
the second center wavelength is different from the first wavelength and the second wavelength, and
the first center wavelength and the second center wavelength are positioned between the first wavelength and the second wavelength.

13. The photodetection apparatus according to claim 1, wherein
a wavelength of the third light beam is different from the first wavelength and the second wavelength, and
the wavelength of the third light beam is positioned between the first wavelength and the second wavelength.

14. The photodetection apparatus according to claim 1, wherein
short wavelength edges of the first and second transmission ranges are longer than the first wavelength, and
long wavelength edges of the first and second transmission ranges are shorter than the second wavelength.

15. The photodetection apparatus according to claim 1, wherein
at least one of the first light beam or the second light beam passes through the object from a different side thereof.

16. A photodetection apparatus comprising:
a first light source configured to apply a first light beam having a first wavelength as a center wavelength to an object;
a second light source configured to apply a second light beam having a second wavelength as a center wavelength longer than the first wavelength to the object;
an optical filter configured to receive and optically filter a third light beam produced by the first light beam and the second light beam each passed through or reflected by the object, the optical filter having a spectral transmission curve, of which range of transmission is longer than the first wavelength and shorter than the second wavelength;
an optical detector configured to determine an amount of the third light beam passed through the optical filter; and
controlling circuitry configured to control intensity of the first light beam and intensity of the second light beam.

17. The photodetection apparatus according to claim 16, wherein each of the first light beam and the second light beam is a pulsed light beam.

18. The photodetection apparatus according to claim 16, wherein the first light source is configured to apply the first light beam to a target surface of the object at a certain incident angle from one side of the target surface, and
the second light source is configured to apply the second light beam to the target surface at the certain incident angle from another side of the target surface.

19. The photodetection apparatus according to claim 16, wherein the third light beam is an interference light beam produced by interference between the first light beam and the second light beam.

20. The photodetection apparatus according to claim 16, further comprising processing circuitry configured to calculate a ratio between the intensity of the first light beam and the intensity of the second light beam to produce an image indicating a relationship between ratios and the amount of the third light beam.

21. The photodetection apparatus according to claim 16, further comprising processing circuitry configured to calculate at least one selected from the group consisting of a first proportion of the intensity of the first light beam to a total of the intensity of the first light beam and the intensity of the second light beam and a second proportion of the intensity of the second light beam to the total to produce an image indicating a relationship between the amount of the third light beam and at least one selected from the group consisting of the first proportion and the second proportion.

22. The photodetection apparatus according to claim 16, wherein
a center wavelength of the range of transmission is different from the first wavelength and the second wavelength, and
the center wavelength of the range of transmission is positioned between the first wavelength and the second wavelength.

23. The photodetection apparatus according to claim 16, wherein
a wavelength of the third light beam is different from the first wavelength and the second wavelength, and
the wavelength of the third light beam is positioned between the first wavelength and the second wavelength.

24. The photodetection apparatus according to claim 16, wherein
a short wavelength edge of the range of transmission is longer than the first wavelength, and
a long wavelength edge of the range of transmission is shorter than the second wavelength.

25. The photodetection apparatus according to claim 16, wherein
at least one of the first light beam or the second light beam passes through the object from a different side thereof.

26. An apparatus comprising:
a first light source for emitting a first light beam having a first wavelength as a center wavelength;
a second light source for emitting a second light beam having a second wavelength as a center wavelength;
an optical filter including a first region and a second region;
a first optical detector, provided for the first region, for determining a first amount of light passed through the first region; and
a second optical detector, provided for the second region, for determining a second amount of light passed through the second region, wherein:
a spectral transmission curve of the first region has a first center wavelength, a first transmission range and a first width at half maximum;
a spectral transmission curve of the second region has a second center wavelength, a second transmission range and a second width at half maximum;
the first and second transmission ranges are located between the first wavelength and the second wavelength; and the first width at half maximum is different from the second width at half maximum.

27. The apparatus according to claim 26, wherein
the first center wavelength is different from the first wavelength and the second wavelength,
the second center wavelength is different from the first wavelength and the second wavelength, and
the first center wavelength and the second center wavelength are positioned between the first wavelength and the second wavelength.

28. The apparatus according to claim 26, wherein
short wavelength edges of the first and second transmission ranges are longer than the first wavelength, and
long wavelength edges of the first and second transmission ranges are shorter than the second wavelength.

29. The apparatus according to claim 26, wherein
at least one of the first light beam or the second light beam passes through the object from a different side thereof.

\* \* \* \* \*